(12) United States Patent
Yourist (10) Patent No.: US 8,715,562 B2
(45) Date of Patent: May 6, 2014

(54) METHOD OF MAKING A CONTAINER HAVING A TETHERED CLOSURE

(75) Inventor: Sheldon E. Yourist, York, PA (US)

(73) Assignee: Graham Packaging Company, L.P., York, PA (US)

( * ) Notice: Subject to any disclaimer, the term of this patent is extended or adjusted under 35 U.S.C. 154(b) by 186 days.

(21) Appl. No.: 13/085,000

(22) Filed: Apr. 12, 2011

(65) Prior Publication Data

US 2012/0261421 A1 Oct. 18, 2012

(51) Int. Cl.
*B29C 49/04* (2006.01)

(52) U.S. Cl.
USPC ............ 264/536; 264/540; 264/523; 264/161

(58) Field of Classification Search
None
See application file for complete search history.

(56) References Cited

U.S. PATENT DOCUMENTS

| | | | |
|---|---|---|---|
| 5,601,214 A * | 2/1997 | Hendrickson et al. | ........ 222/517 |
| 5,762,859 A | 6/1998 | Kani | |
| 6,290,094 B1 | 9/2001 | Arnold et al. | |
| 6,555,033 B2 | 4/2003 | Cargile et al. | |

FOREIGN PATENT DOCUMENTS

| CN | 201020114531.6 | 6/2010 |
|---|---|---|
| CN | 201756207 U | 3/2011 |

* cited by examiner

*Primary Examiner* — Monica Huson
(74) *Attorney, Agent, or Firm* — Baker Botts L.L.P.

(57) ABSTRACT

A method of making a plastic container that has a tethered closure using an extrusion blow molding process includes steps of extruding a parison, capturing the parison within a mold and inflating the parison against the mold to form a container blank having a container portion, a closure portion and a tether portion for connecting the container portion to the closure portion. The tether portion, which is preferably elongated and string like, may be formed out of flash material that is created during the molding process. The resulting container is relatively inexpensive to manufacture and facilitates the plastic recycling process.

19 Claims, 15 Drawing Sheets

METHOD OF MAKING A CONTAINER HAVING A TETHERED CLOSURE

BACKGROUND OF THE INVENTION

1. Field of the Invention

This invention relates generally to the field of plastic containers, and more specifically to blow molded plastic containers of the type that have a closure to selectively open and close a dispensing opening.

2. Description of the Related Technology

Plastic containers for substances such as food, liquids and other consumer products are often manufactured using the extrusion blow molding process, in which a continuously extruded hot plastic tube or parison is captured within a mold and inflated against the inner surfaces of the mold to form a container blank. In such systems, the mold is typically designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion.

The extrusion blow molding process can be used to fabricate a container having a dispensing opening through which the consumer will access a product that is packaged within the container. A separate closure, which may be a threaded cap or a plug, is typically provided to selectively open and close the dispensing opening. The closure is often fabricated from a material that is different than the material from which the container is fabricated, which complicates the plastic recycling process. In many instances, the closure must be manufactured using a fabrication process, such as injection molding, that is separate from that of the container, which adds to the total expense of container fabrication. Moreover, a conventional closure can become separated from the container, leaving a consumer with no way to effectively seal the dispensing opening. A separated closure can also present a choking threat to small children, or it can become litter if not disposed of correctly.

A need exists for an improved blow molded plastic container having a closure that can be inexpensively manufactured, is optimal for recycling purposes and that reduces the potential for the closure to become separated from the container during use.

SUMMARY OF THE INVENTION

Accordingly, it is an object of the invention to provide an improved blow molded plastic container having a closure that can be inexpensively manufactured, is optimal for recycling purposes and that reduces the potential for the closure to become separated from the container during use.

In order to achieve the above and other objects of the invention, a method of making a container according to a first aspect of the invention includes steps of extruding a parison; capturing the parison within a mold; and inflating the parison against the mold to form a container blank having a container portion, a closure portion and a tether portion for connecting the container portion to the closure portion.

A method of making a container according to a second aspect of the invention includes steps of extruding a parison; capturing the parison with a mold; and inflating the parison against the mold to form a container blank having a container portion and a tether portion for connecting the container portion to a closure.

A hollow plastic container according to a third aspect of the invention includes a container body having an opening defined therein that is constructed and arranged to be engaged by a closure, and a tether for attaching a closure to the container body. The tether is unitary with the container body.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
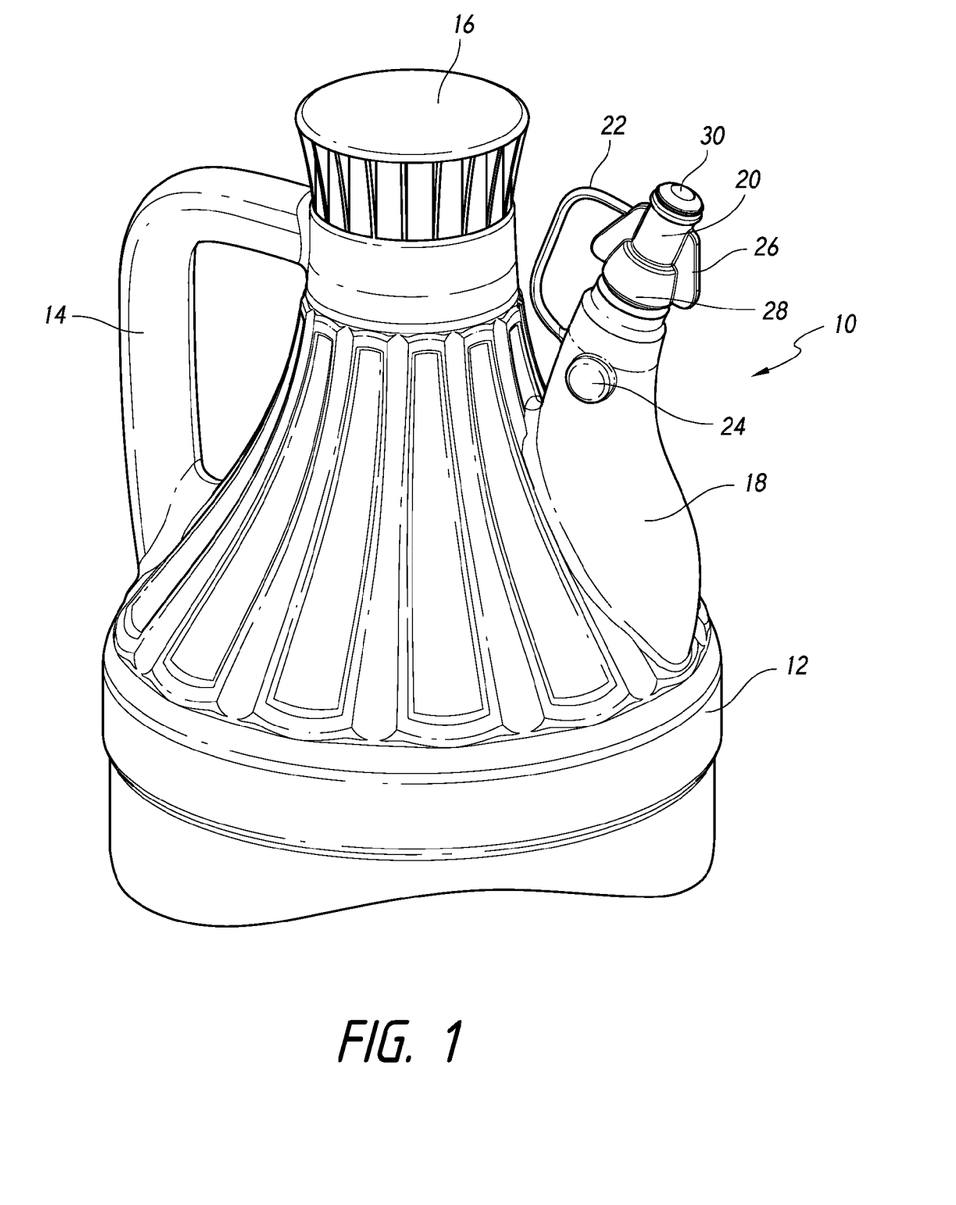
FIG. 1 is a fragmentary perspective view of a plastic container that is constructed according to a first embodiment of the invention.

Referring now to the drawings, wherein like reference numerals designate corresponding structure throughout the views, and referring in particular to FIG. 1, a plastic container 10 that is constructed according to a preferred embodiment of the invention includes a main body portion 12 having an integral handle 14 and a closure cap 16 that is screwed onto a threaded finish portion. Plastic container 10 further includes a spout 18 that is frangibly connected to a closure 20 that is integrally molded together with the spout 18.

A tether 22 has a first end that is integral with the spout 18 and a second end that is integral with the closure 20. Tether 22 is preferably elongated and string-like.

The plastic container 10 is preferably fabricated from a single or multilayer extrudable plastic material such as polyolefin, polypropylene or polyethylene.

The closure 20 preferably includes a pair of gripping tabs 26 that are constructed and arranged to facilitate twisting of the closure 20 by a consumer using the forefinger and thumb. Closure 20 also preferably includes a first end 28 that is frangibly attached to a distal end of the spout 18 and a second end 30 that is constructed and arranged to be inserted into a dispensing opening 32 that is defined in the distal end of the spout 18 in order to seal or close the opening 32 after the closure 20 has been separated from the spout 18 by the consumer.

Figure 2:
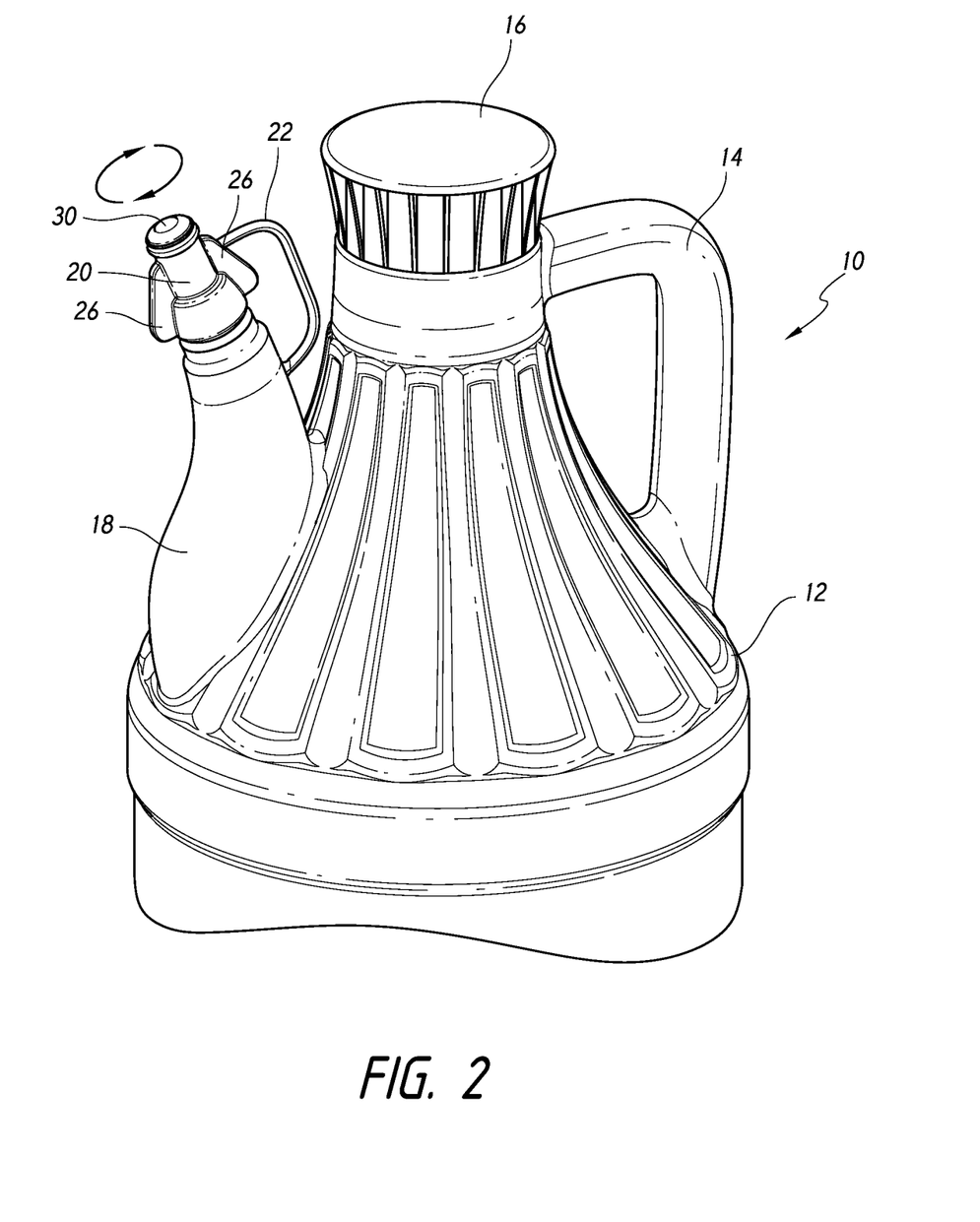
FIG. 2 is a second fragmentary perspective view of the plastic container that is shown in FIG. 1.

FIG. 2 diagrammatically depicts a consumer twisting the closure 20, using the gripping tabs 26, relative to the spout 18 in order to rupture the frangible connection between the spout 18 and the closure 20 to separate the closure 20 from the spout 18.

Figure 3:
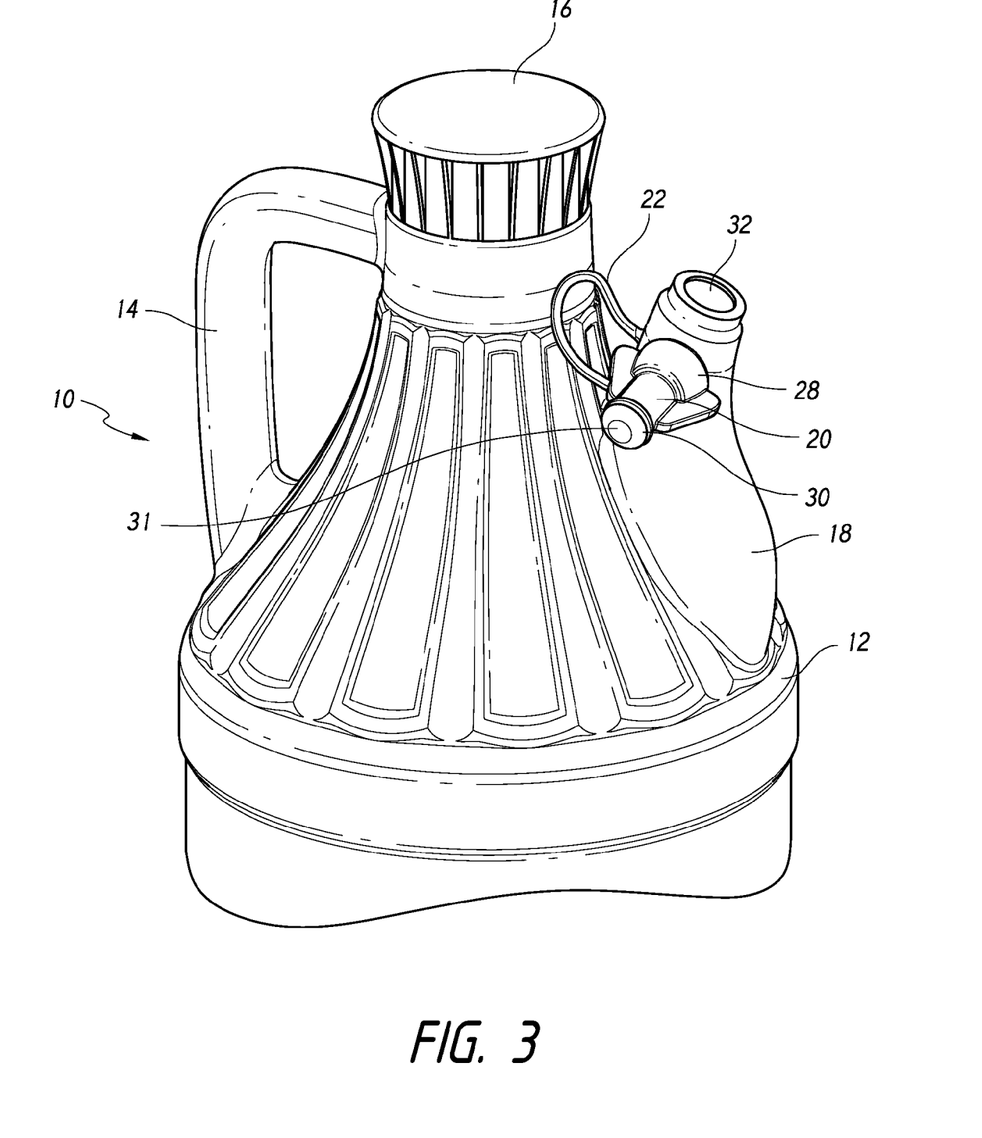
FIG. 3 is a third fragmentary perspective view of the plastic container that is shown in FIG. 1, showing the container in a second operative position.

FIG. 3 depicts the closure 20 after it has been separated from the spout 18. As FIG. 1 best shows, an attachment tab 24 is preferably provided that is an integral projection extending from a side of the spout 18. The first end 28 of the closure 20 includes a recess that has a circumferential sidewall that is constructed and arranged to fit over the attachment tab 24 in an interference fit in order to releasably secure the closure 20 onto the side of the spout 18, as is shown in FIG. 3.

Figure 4:
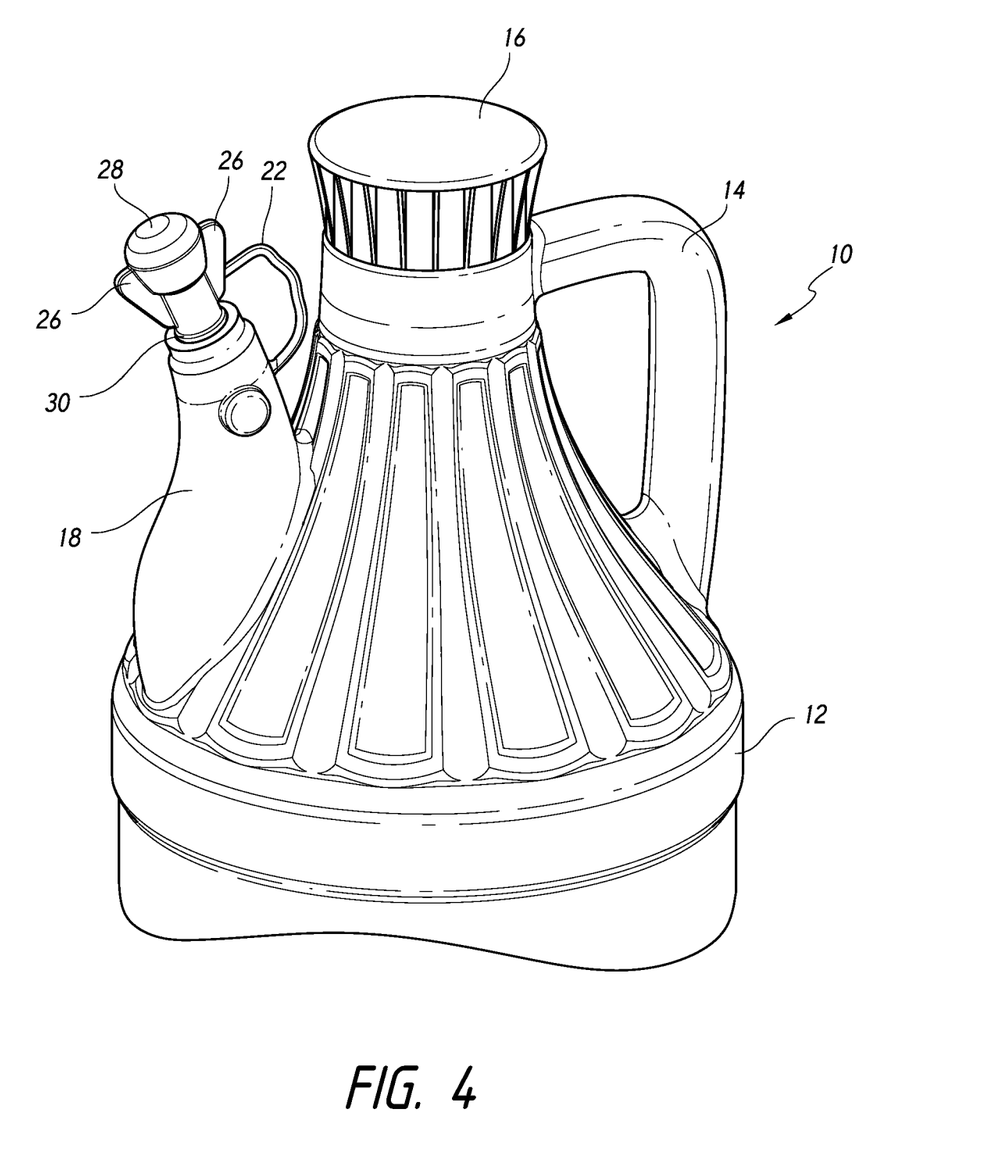
FIG. 4 is a fourth fragmentary perspective view of the plastic container that is shown in FIG. 1, showing the container in a third operative position.

FIG. 4 shows the second end 30 of the closure 20 secured within the opening 32 that is defined at the distal end of the spout 18. Preferably, the second end 30 has a plug head 31 that is constructed and arranged to engage the inner surfaces of the distal end of the spout 18 that define the opening 32 in an interference fit or a snap fit.

Figure 5:
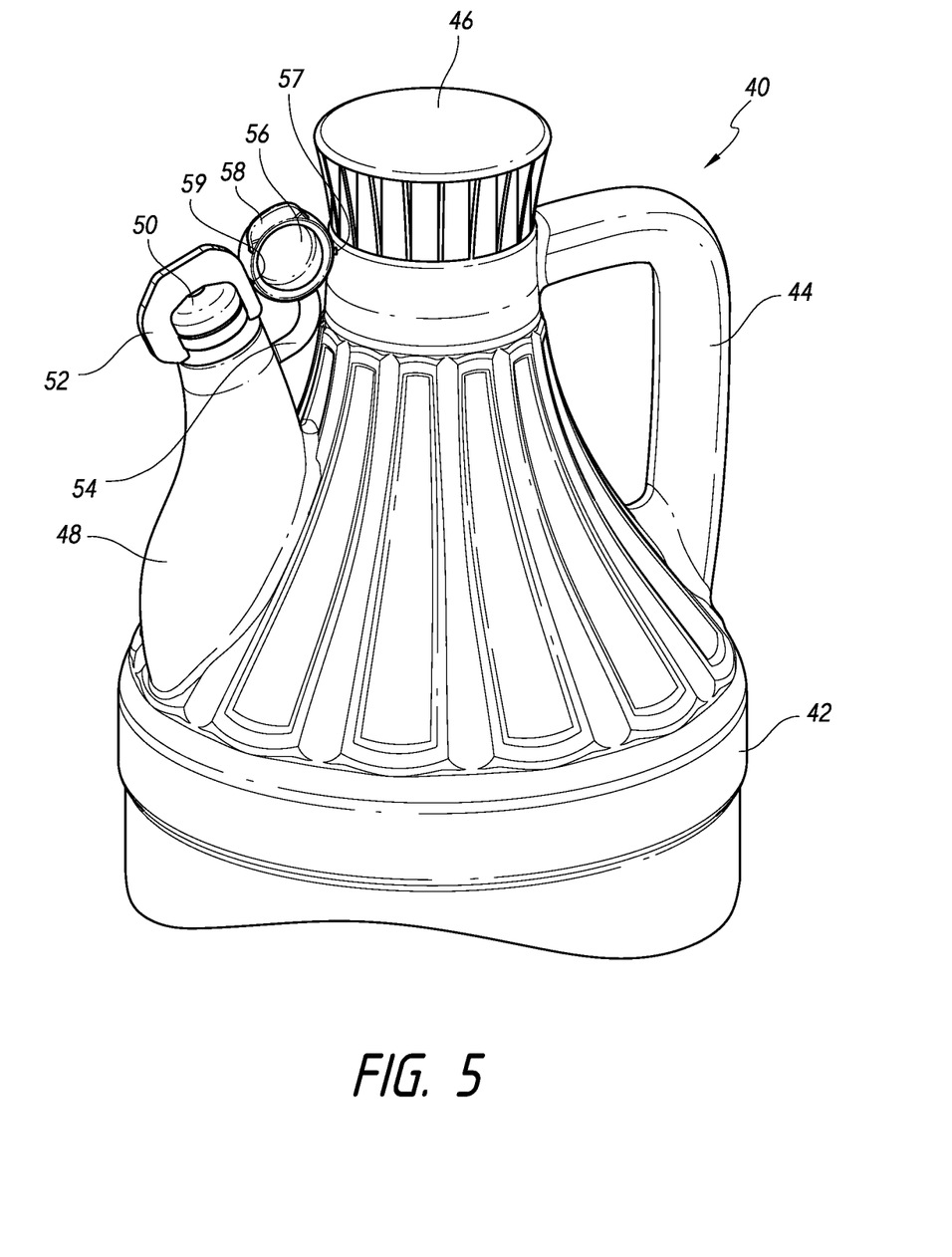
FIG. 5 is a fragmentary perspective view of a plastic container that is constructed according to a second embodiment of the invention.

FIG. 5 depicts a container 40 that is constructed according to a second embodiment of the invention. Container 40 includes a main body portion 42, an integral handle 44 and a closure cap 46 that is screwed onto a threaded nipple that is integral with the top of the main body portion 42. Container 40 also includes a spout 48 that has a removable end portion 50 frangibly attached to a distal end thereof. The removable end portion 50 preferably includes a gripping tab 52 that is constructed and arranged to be twisted by a consumer in order to remove the removable end portion 50 from the distal end of the spout 48.

A closure 56 is integrally molded with the spout 48 and is connected to the spout 48 by a flexible tether 54. Closure 56 is frangibly connected to a neck portion of the container 40 by a first frangible web 57, and to the removable end portion 50 by a second frangible web 59.

Figure 16:
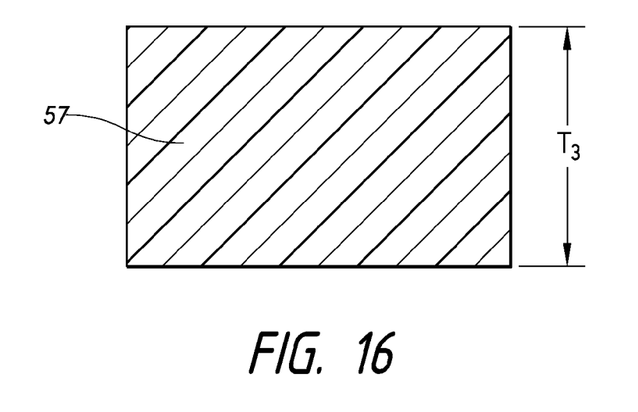
FIG. 16 is a diagrammatical cross-sectional view taken through a frangible connecting web according to one of the embodiments of the invention.

As FIG. 16 shows, first and second frangible webs 57, 59 each preferably have a maximum thickness $T_3$, which is preferably substantially within a range of about 0.25 mm to about 0.6 mm, more preferably substantially within a range of about 0.3 mm to about 0.55 mm, and most preferably substantially within a range of about 0.4 mm to about 0.5 mm.

As will be described in greater detail below, the first and second frangible webs 57, 59 are preferably compression molded during the molding process and are separated with respect to integrally formed flash material by trimming or die cutting process post molding. Compression molding refers to the formation of part of a hollow plastic component during the blow molding process in which the part is formed of a solid piece of plastic material with no interior space defined therein.

Figure 6:
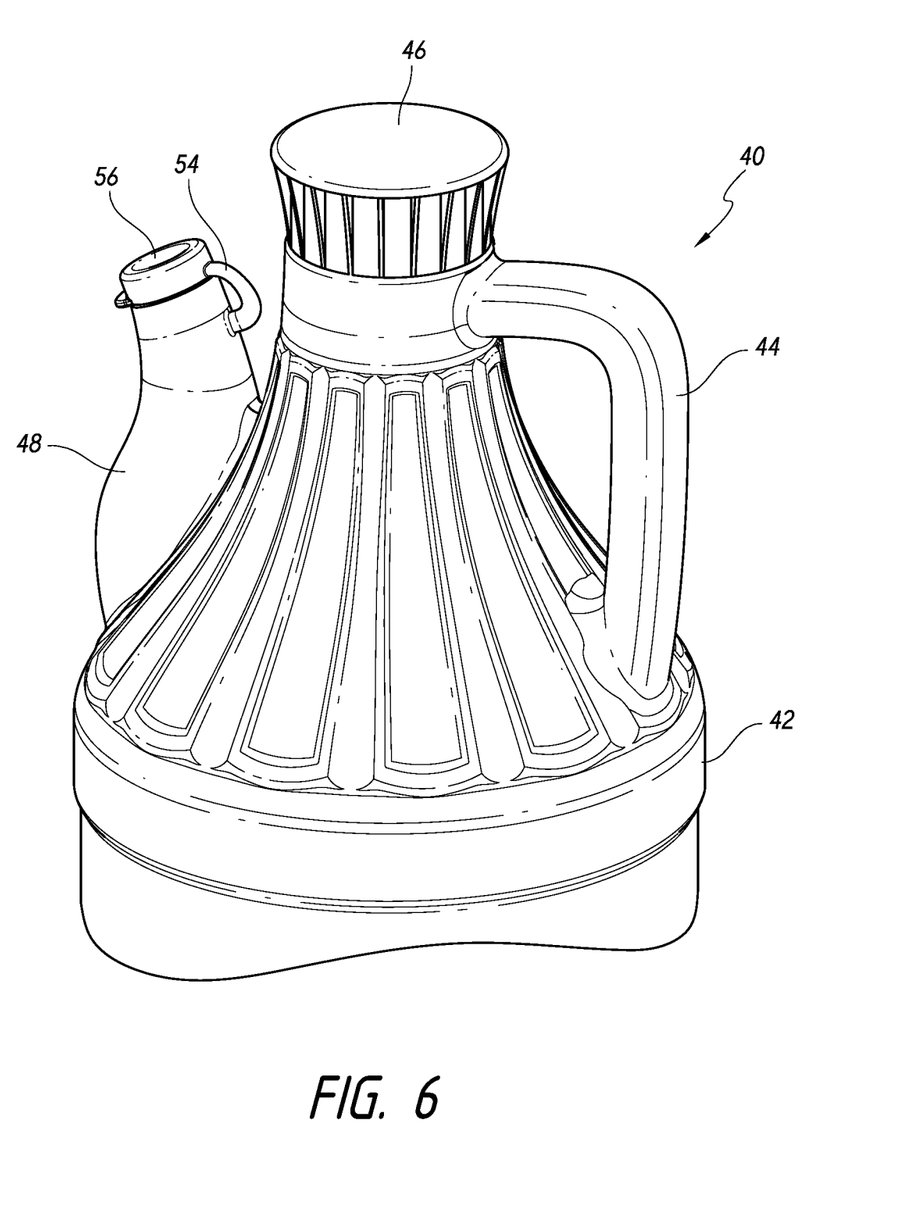
FIG. 6 is a second fragmentary perspective view of the plastic container that is depicted in FIG. 5, showing the container in a second operative position.

The closure 56 also preferably has a lifting tab 58, and is adapted to snap on to the distal end of the spout 48 after the removable end portion 50 has been removed by the consumer. FIG. 6 shows the container 40 with the closure 56 snapped into place an order to seal the dispensing opening at the distal end of the spout 48.

Figure 7:
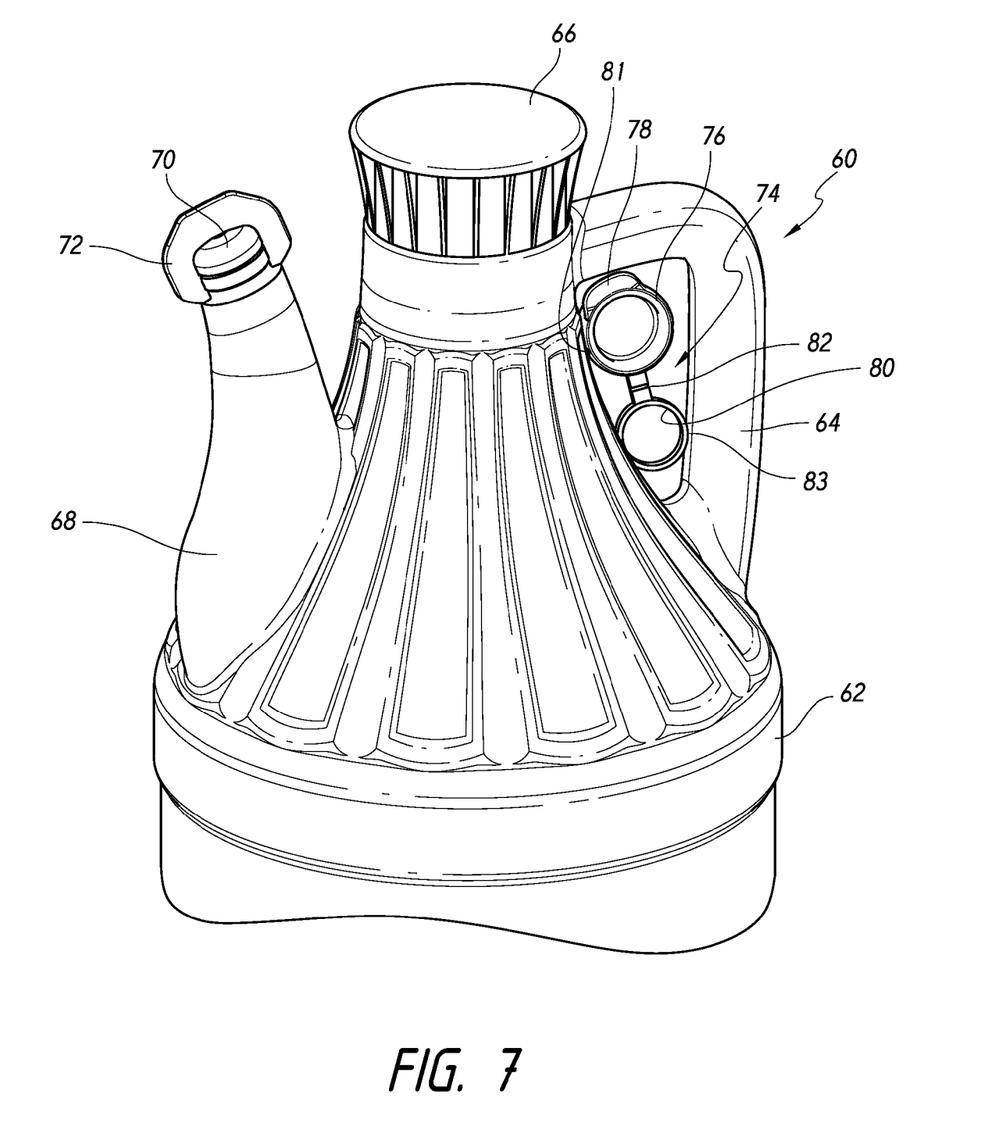
FIG. 7 is a fragmentary perspective view of a plastic container that is constructed according to a third embodiment of the invention.
Figure 8:
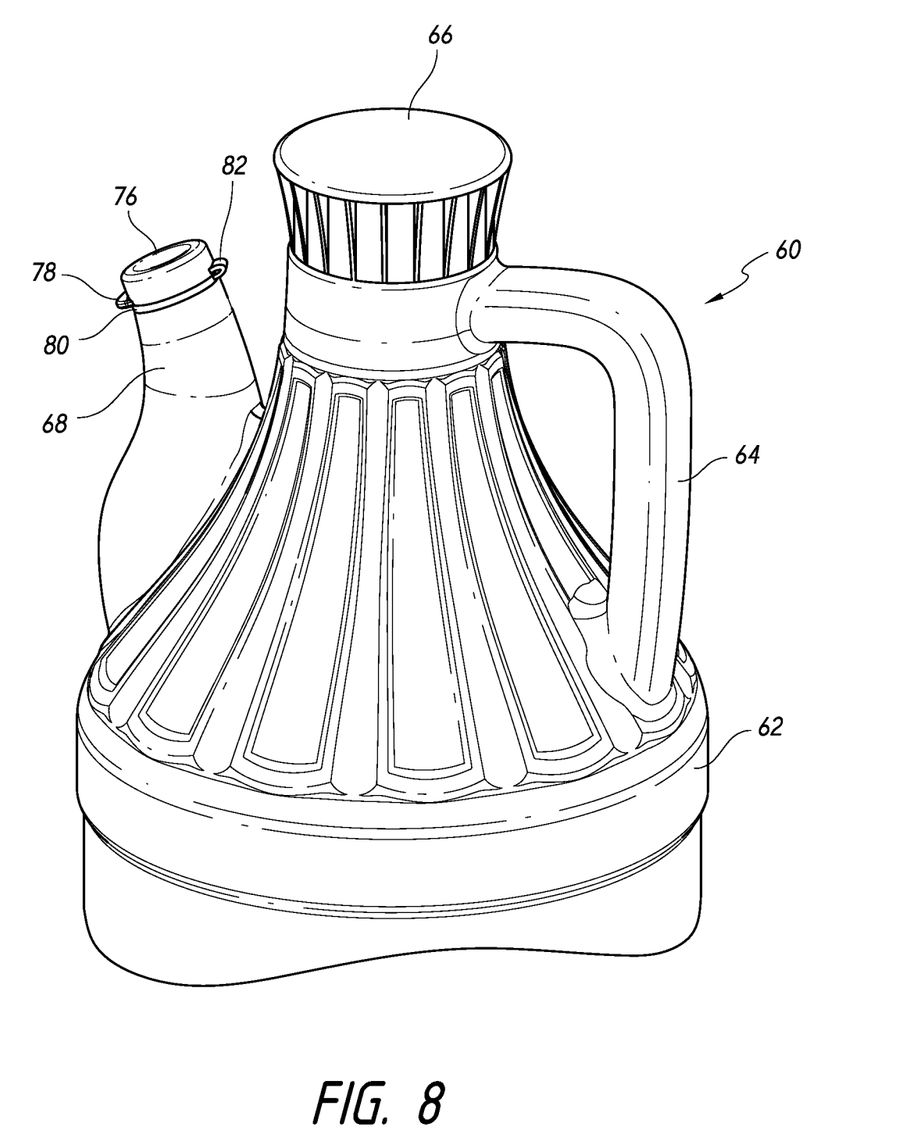
FIG. 8 is a fragmentary perspective view of the plastic container that is shown in FIG. 7, shown in a second operative position.

In the embodiment that is shown in FIGS. 7 and 8, a container 60 has a main body portion 62, an integral handle 64 and a closure cap 66 that is screwed onto a threaded nipple that is integral with the top of the main body portion 62. The container 60 has a spout 68 that has a removable end portion 70 frangibly attached to a distal end thereof. The removable end portion 70 has a gripping tab 72 that is constructed and arranged to be twisted by a consumer in order to remove the removable end portion 70 from the distal end of the spout 68.

A closure assembly 74 is integrally molded with the main body portion 62 and the handle 64. The closure assembly 74 includes a closure 76 having a lifting tab 78 and a retaining ring 80 that is attached to the closure 76 by an integral tether 82. The closure assembly 74 is frangibly attached by frangible webs 81, 83 respectively to the main body portion 62 and the handle 64 when the container 60 reaches the consumer.

After the consumer has removed the removable end portion 70 from the distal end of the spout 68 by gripping and twisting the tab 72, he or she will remove the closure assembly 74 from the container 60. The retaining ring 80 of the closure assembly 74 will then be snapped over an annular projection that is provided at the distal end of the spout 68. The closure 76 will then be snapped over the annular projection in order to seal the dispensing opening that is provided at the distal end of the spout 68. The closure 76 is shown applied to the distal end of the spout 68 in FIG. 8.

Figure 9:
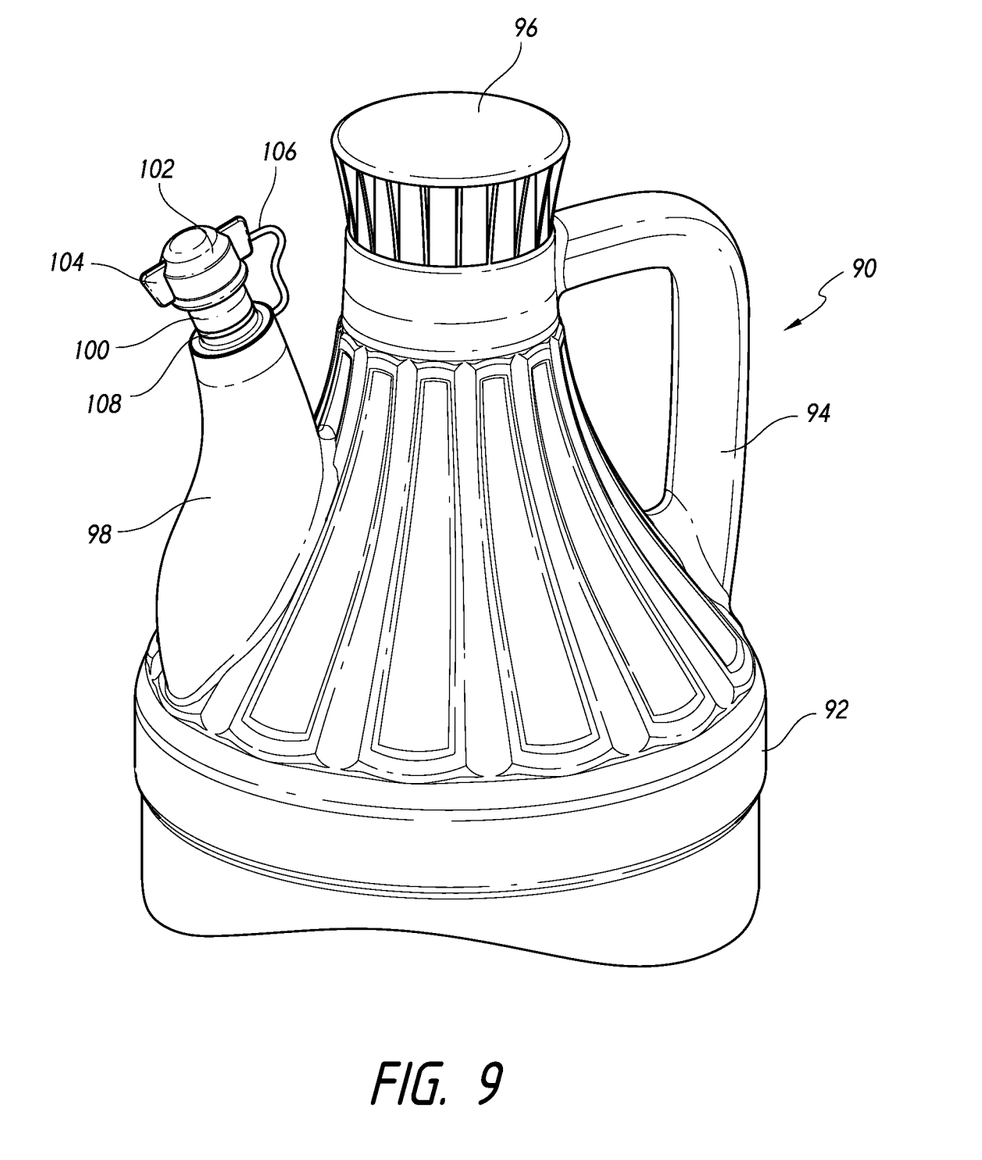
FIG. 9 is a fragmentary perspective view of a plastic container that is constructed according to a fourth embodiment of the invention.
Figure 10:
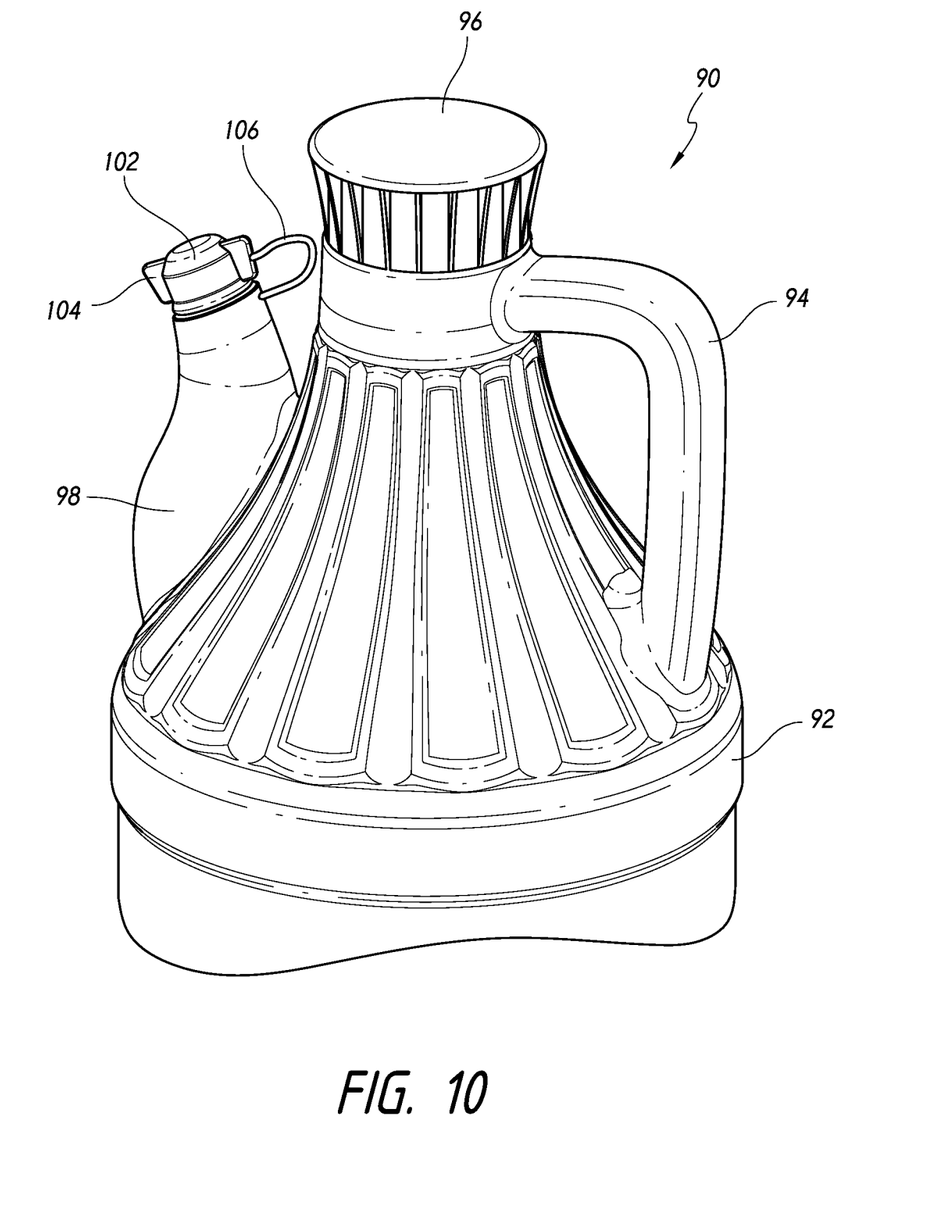
FIG. 10 is a fragmentary perspective view of the plastic container shown in FIG. 9, shown in a second operative position.
Figure 11:
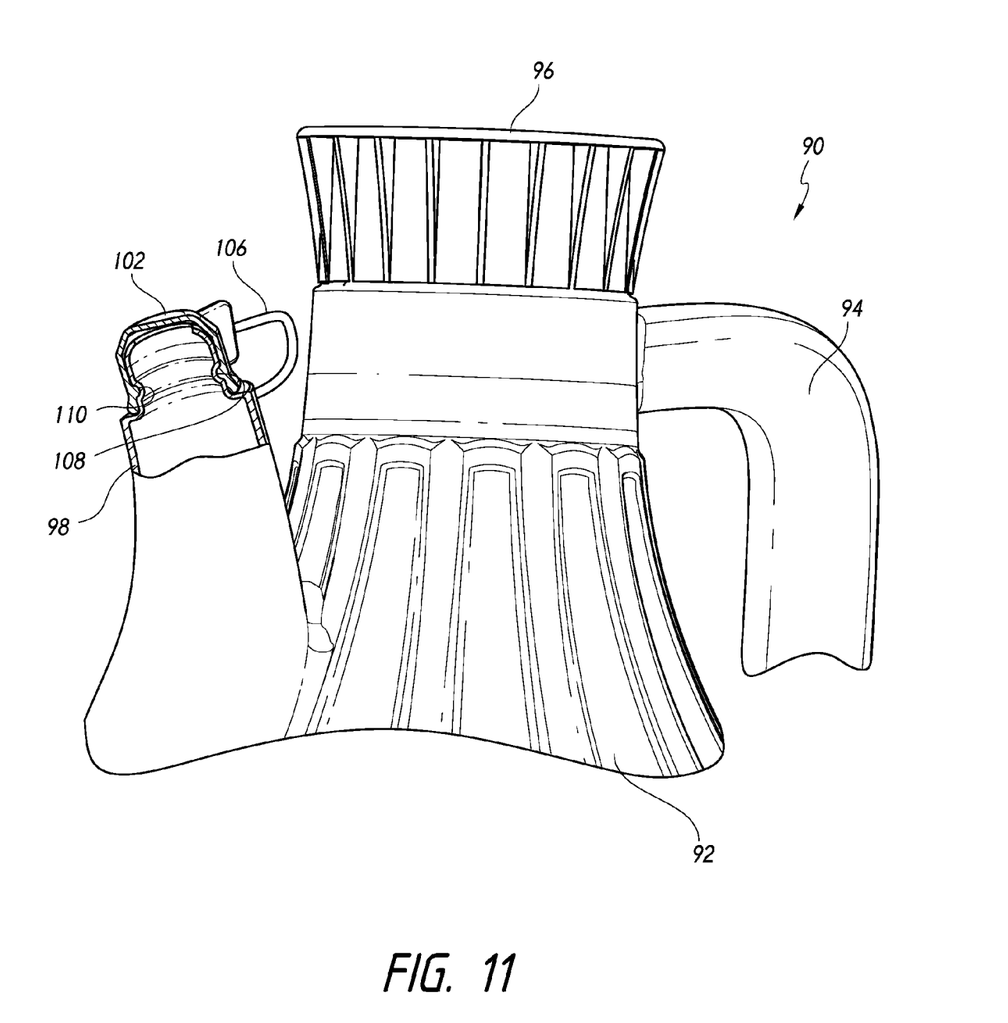
FIG. 11 is a fragmentary cross-sectional view of the plastic container that is shown in FIGS. 9 and 10.

FIGS. 9-11 depict a container 90 that is constructed according to a fourth embodiment of the invention. In this embodiment, a main body portion 92 includes an integral handle 94. A closure cap 96 is applied to a threaded nipple that is integral with an upper portion of the main body portion 92. Container 90 includes a spout 98 that includes at a distal end thereof a mounting nipple 100 having an annular groove 108 defined therein. A closure 102 is frangibly connected to a distal end of the mounting nipple 100, as is shown in FIG. 9. The closure 102 preferably includes a pair of gripping tabs 104. A flexible tether 106 is provided that is integral with the closure 102 at a first end and with the spout 98 at a second end.

The consumer will remove the closure 102 from the mounting nipple 100 by gripping and twisting the gripping tabs 104. In order to close the dispensing opening at the distal end of the spout 98, he or she will press the closure 102 downwardly over the mounting nipple 100 until an annular projection 110 that is defined on the inner surface of the closure 102 snaps over the annular groove 108. This is best shown in the cross-sectional view that is provided in FIG. 11.

Figure 12:
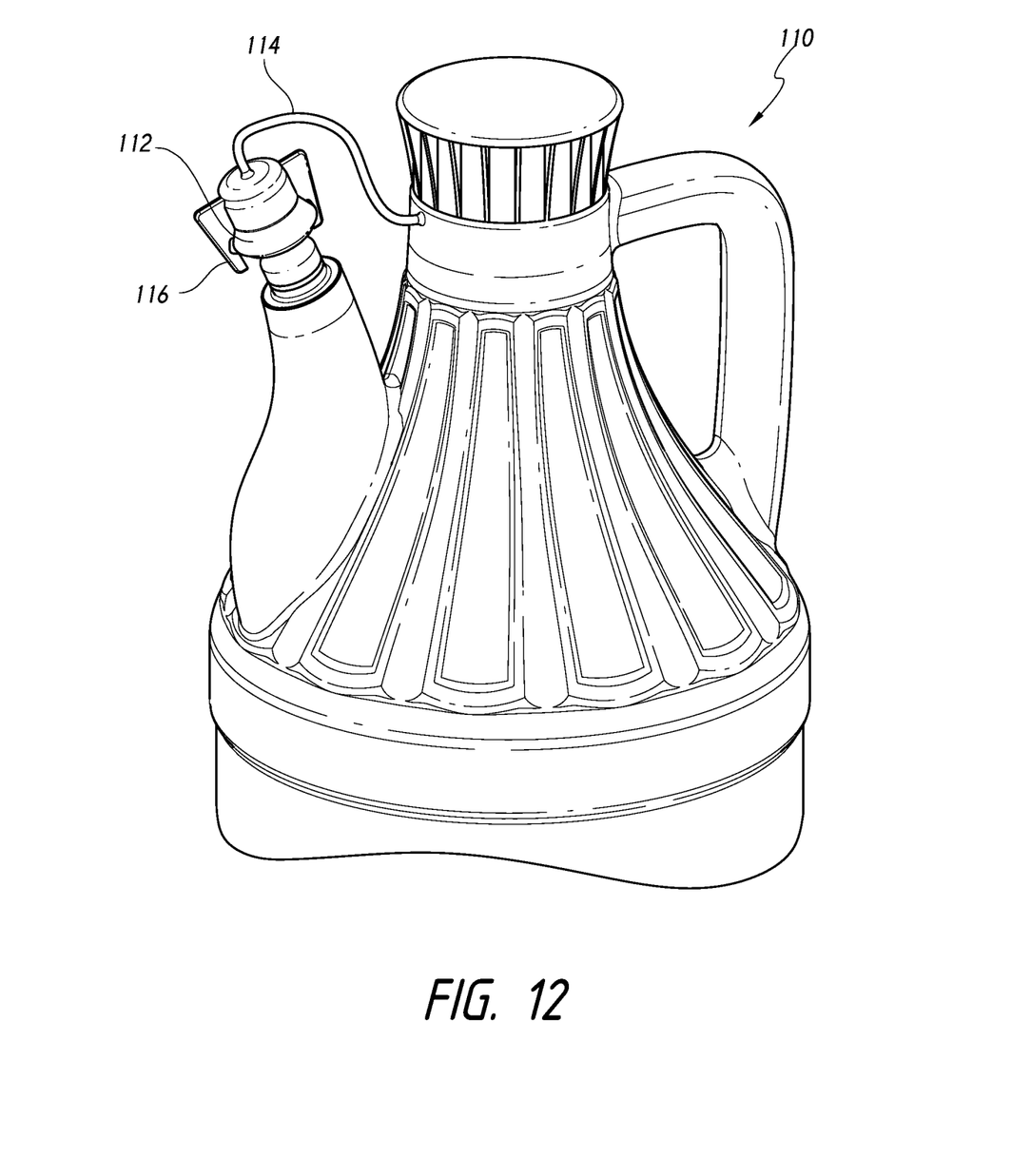
FIG. 12 is a side elevational view of a plastic container that is constructed according to a fifth embodiment of the invention.
Figure 14:
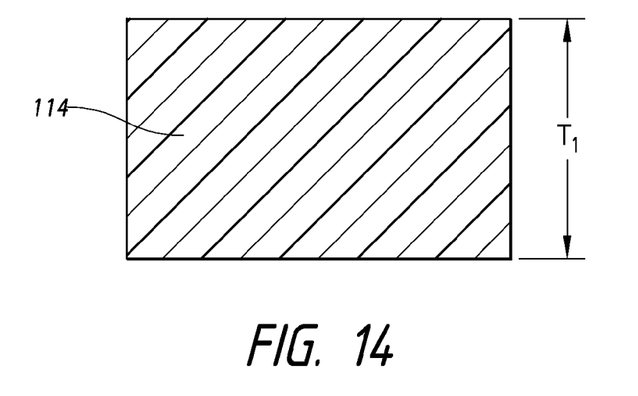
FIG. 14 is a diagrammatical cross-sectional view taken through a tether component according to the fifth embodiment of the invention.

FIG. 12 depicts a container 110 that is constructed according to a fifth embodiment of the invention, which is identical to the container that was described with respect to the previous embodiment other than the shape of the closure 112 and the position of the tether 114 with respect to the closure 112. In this embodiment, the tether 114 is centered with respect to and attached to an upper portion of the closure 112, which makes it easier for a consumer to initially separate the closure 112 from the spout by twisting. The tether 114 has a maximum thickness $T_1$, as is shown in FIG. 14, which is preferably substantially within a range of about 0.6 to about 1.9 mm, more preferably substantially within a range of about 0.7 mm to about 1.3 mm and most preferably substantially within a range of about 0.8 mm to about 1.1 mm.

Additionally, in this embodiment the gripping tabs 116 of the closure 112 include a downwardly extending projection that is constructed and arranged to fit snugly against the side of the spout when the closure 112 is in the sealed position with respect to the spout.

Figure 17:
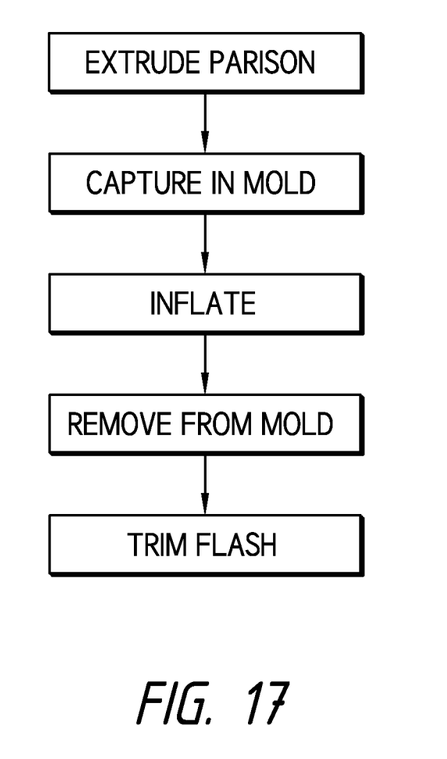
FIG. 17 is a flow chart depicting a method of making a plastic container according to the preferred embodiment of the invention.

In each of the embodiments described above, the entire container other than the closure cap that is screwed onto the top of the main body portion is integrally molded using an extrusion blow molding process in which a hollow plastic parison is continuously extruded and periodically captured within a moving mold. As FIG. 17 shows, the captured portion of the parison is inflated against the inside surfaces of the mold to form a container blank, which will include flash material that is trimmed from the container blank after the container blank has been ejected from the mold. The respective tethers 22, 54, 82 and 106 are preferably formed as part of the flash material during the molding process, which is trimmed in order to create the elongated, flexible tether 22, 54, 82 and 106 that has been described and shown herein.

Figure 13:
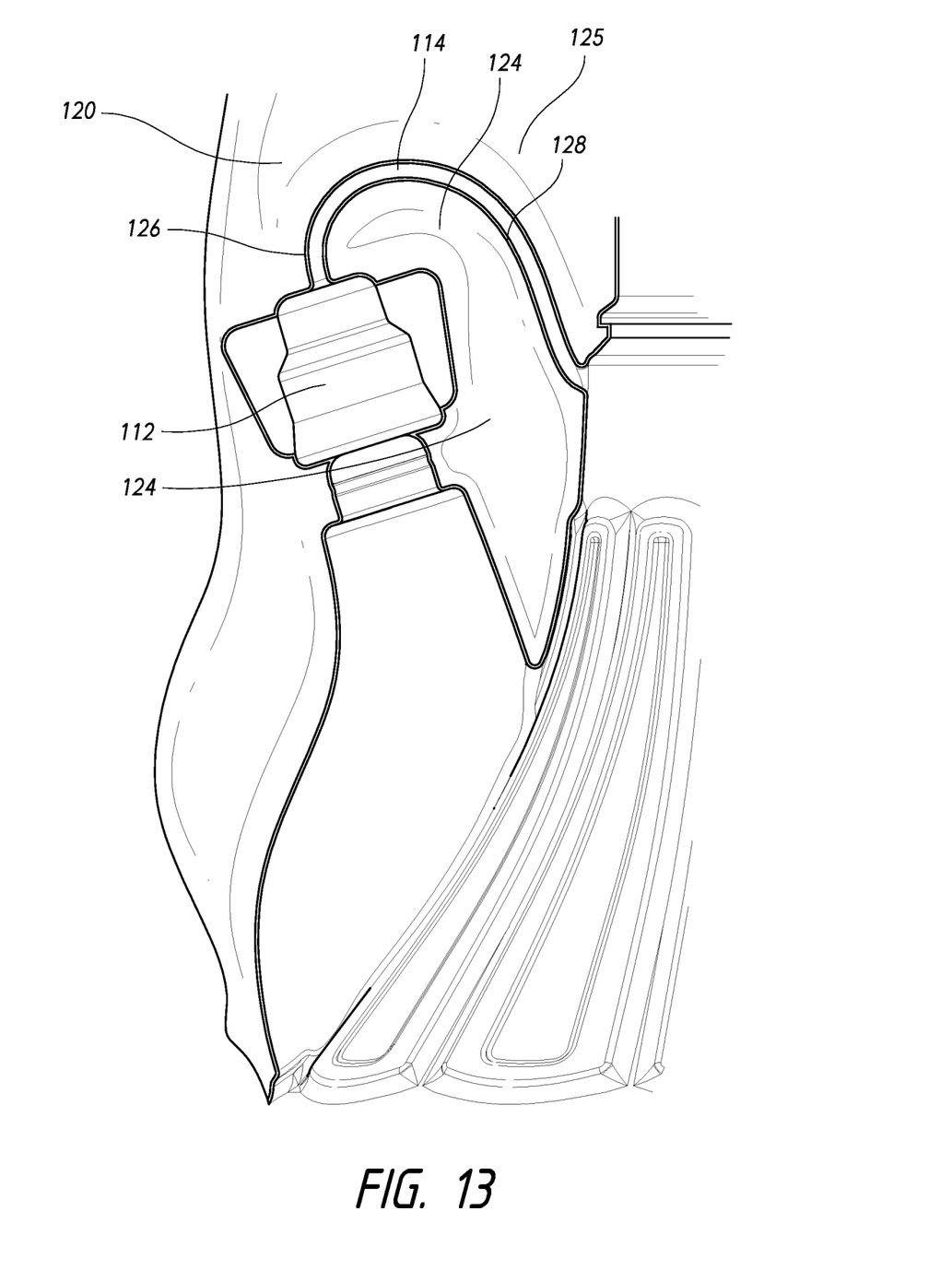
FIG. 13 is a fragmentary side elevational view of the container blank that is used in the manufacture of the embodiment of the invention that is shown in FIG. 12.

FIG. 13 depicts a container blank 120 that is used to manufacture the container 110 that is depicted in FIG. 12. As FIG. 13 shows, a first piece 124 of flash material is formed by the molding process between the closure 112 and the tether 114 and a second piece 125 of flash material is defined on an opposite side of the tether 114. The tether 114 is preferably compression molded. A first compression molded thin frangible web 128 is defined between the tether 114 and the first piece 124 of flash material, and a second compression molded thin frangible web 126 is defined between the tether 114 and a second piece 125 of flash material. After molding of the container blank 120, the thin frangible webs 126, 128 are fractured or cut during the flash removal process in order to form the tether 114 out of the flash material.

Figure 15:
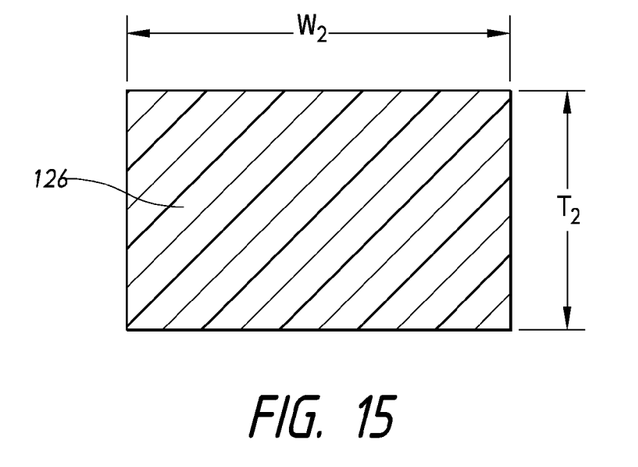
FIG. 15 is a diagrammatical cross-sectional view taken through a compression molded portion of the container blank that is shown in FIG. 13.

The thin frangible webs 126, 128 have a maximum thickness $T_2$, as is shown in FIG. 15, which is preferably substantially within a range of about 0.05 mm to about 0.5 mm, more preferably substantially within a range of about 0.1 mm to about 0.4 mm and most preferably substantially within a range of about 0.15 mm to about 0.35 mm. The thin frangible webs 126, 128 further have an average width $W_2$, as is shown in FIG. 15, which is preferably substantially within a range of about 0.25 mm to about 1.0 mm After the flash material has been trimmed from the container blank, the containers as they are depicted in FIGS. 1, 5, 7, and 9 will have been formed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making a container, comprising:
extruding a parison;
capturing the parison within a mold; and
inflating the parison against the mold to form a container blank having a container portion, a closure portion and a tether portion for connecting the container portion to the closure portion, and wherein the container portion, the closure portion and the tether portion are integrally molded together, and the tether portion is formed from flash material formed integrally with the container portion during the inflating of the parison against the mold.

2. A method of making a container according to claim 1, wherein the tether portion is connected to the container portion by the flash material, the method further comprising trimming the flash material.

3. A method of making a container according to claim 1, wherein the container blank further has closure mounting structure for mounting the closure portion to the container portion when the closure portion is not in use.

4. A method of making a container according to claim 1, wherein the container blank includes a spout portion, and wherein the closure portion is formed as an extension to the spout portion.

5. A method of making a container according to claim 4, wherein the closure portion has a first end that is frangibly attached to the spout portion.

6. A method of making a container according to claim 5, wherein the closure portion has a second end that is constructed and arranged to fit within the spout portion in order to seal the spout portion when so positioned.

7. A method of making a container according to claim 1, wherein the closure portion has at least one gripping projection formed thereon.

8. A method of making a container according to claim 1, wherein the container blank includes a spout portion, and wherein the spout includes a removable end portion that is frangibly attached to an end of the spout portion.

9. A method of making a container according to claim 1, wherein the container portion has a spout portion, and wherein the tether portion is integrally molded with the spout portion.

10. A method of making a container according to claim 1, wherein the container portion has a spout portion, and wherein the closure portion is constructed and arranged to fit over an end of the spout portion.

11. A method of making a container according to claim 10, wherein the closure portion is constructed and arranged to create a snap fit with respect to the spout portion.

12. A method of making a container according to claim 1, wherein the container portion has a spout portion, and wherein the closure portion is constructed and arranged to fit within an end of the spout portion.

13. A method of making a container according to claim 1, wherein the tether portion is compression molded.

14. A method of making a container according to claim 1, wherein the tether portion is elongated and flexible.

15. A method of making a container, comprising:
extruding a parison;
capturing the parison with a mold; and
inflating the parison against the mold to form a container blank having a container portion and a tether portion for connecting the container portion to a closure, and wherein the container portion and the tether portion are integrally molded together, and the tether portion is formed from flash material formed integrally with the container portion during the inflating of the parison against the mold.

16. A method of making a container according to claim 15, wherein the tether portion is connected to the container portion by the flash material, the method further comprising trimming the flash material.

17. A method of making a container according to claim 15, wherein the container portion has a spout portion, and wherein the tether portion is integrally molded with the spout portion.

18. A method of making a container according to claim 15, wherein the tether portion is compression molded.

19. A method of making a container according to claim 15, wherein the tether portion is elongated and flexible.

* * * * *